April 16, 1940.  W. R. GORDON  2,197,361
GEAR TRANSMISSION FOR TEXTILE MACHINES
Filed March 21, 1939
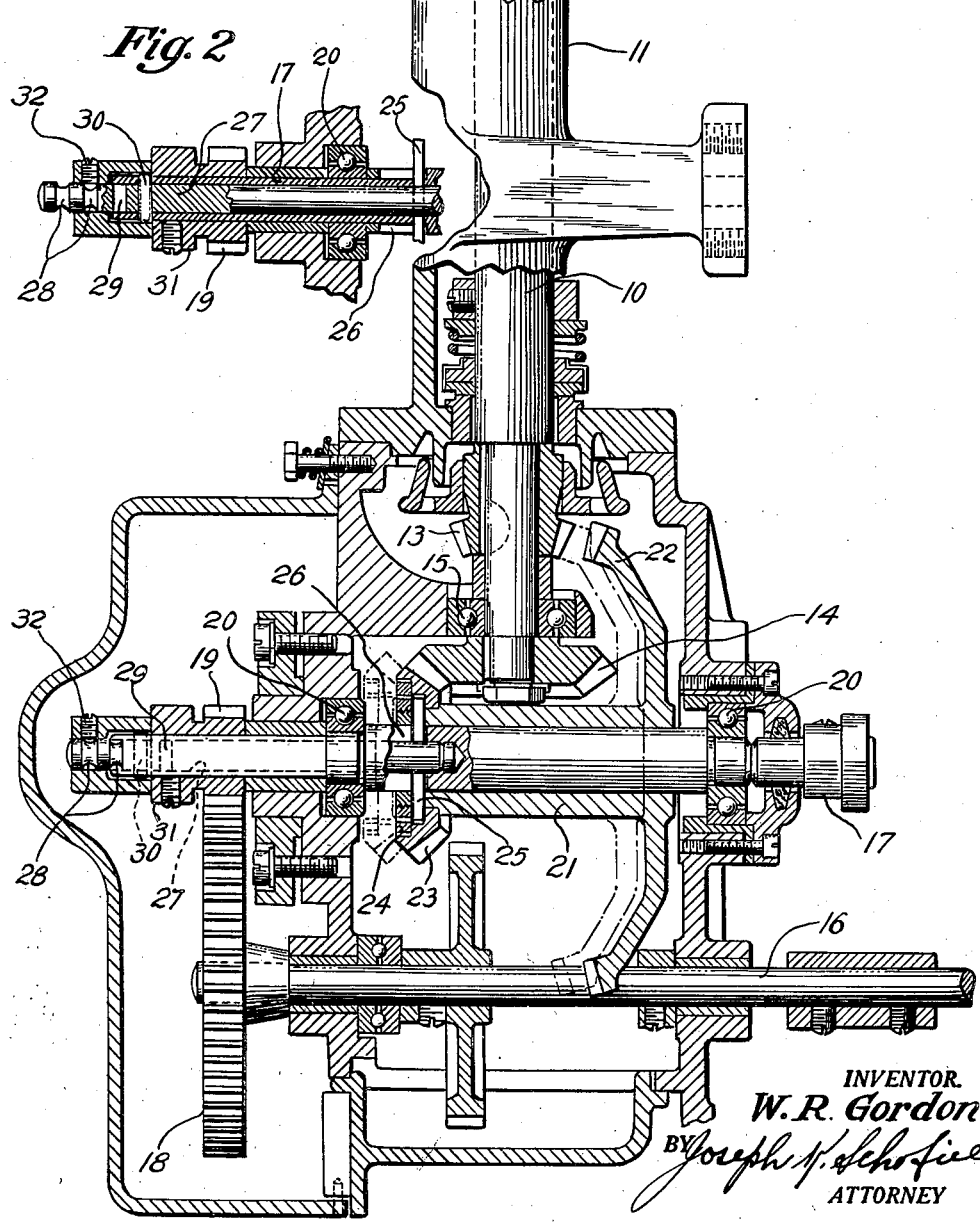
INVENTOR.
W. R. Gordon
BY Joseph N. Schofield
ATTORNEY Patented Apr. 16, 1940

2,197,361

UNITED STATES PATENT OFFICE 2,197,361

GEAR TRANSMISSION FOR TEXTILE MACHINES

William R. Gordon, Stonington, Conn., assignor to The Atwood Machine Company, Stonington, Conn., a corporation of New Jersey Application March 21, 1939, Serial No. 263,124

3 Claims. (Cl. 74—355)

This invention relates to textile machines and particularly to twisting machines for silk, rayon, etc., in which the twist may be widely varied.

A primary object of the invention is to provide a change speed mechanism for a textile twisting machine enabling the operating shaft for the machine controlling the amount of twist given the yarn to be driven at two selected speeds one in each direction by axial adjustment of an intermediate gear carrying shaft.

A feature of importance of the invention is that an intermediate shaft sleeve has opposed bevel gears thereon having widely different numbers of teeth, these gears being movable with the shaft or sleeve to positions adapted to engage one of the gears with its mating gear in one position and the other gear with another mating gear in the other position.

Another feature of importance is that in either position the shaft or sleeve may be secured against axial movement by simple means including a key inserted in either of two positions within a shaft connected to and by which the gear carrying shaft or sleeve may be moved.

With the above and other objects in view the invention may include the features of construction and operation set forth in the following specification and illustrated in the accompanying drawing.

In the accompanying drawing annexed hereto and forming a part of this specification, I have shown the invention embodied in the driving connections for a twisting or doubling and twisting machine for textile yarns but it will be understood that the invention can be otherwise embodied and that the drawing is not to be construed as defining or limiting the scope of the invention, the claims appended to this specification being relied upon for that purpose.

In the drawing:

Fig. 1 shows a cross sectional view of the driving and change speed mechanism in one operative position, and Fig. 2 shows a longitudinal section through one end of the intermediate shaft in its other operative position.

In the above mentioned drawing there has been shown but one embodiment of the invention which is now deemed preferable, but it is to be understood that changes and modifications may be made within the scope of the appended claims without departing from the spirit of the invention.

Briefly, and in its preferred aspect, the invention may include the following principal parts: first, a driving shaft having a driving pulley thereon by means of which the shaft may be rotated at constant speed; second, two spaced bevel gears keyed to said shaft and having a different number of teeth; third, a driven shaft having a driving pinion at one end; fourth, a sleeve slidably mounted thereon at an intermediate portion; fifth, bevel gears on said sleeve adapted to mesh respectively with said bevel gears on said driving shaft; sixth, a key slidable within said intermediate shaft and engaging said sleeve; seventh, a shifting shaft for said sleeve; and eighth, a locking pin or key for said sleeve to retain said sleeve in either of these operative positions.

Referring more in detail to the figures of the drawing there is shown at 10 a driving shaft mounted for rotation within a housing or frame member 11 adapted to be bolted or otherwise secured to an end of a textile machine. At the upper end of this shaft 10 is a driving pulley 12 which may be rotated at any desired constant speed. At the lower end of the shaft 10 are bevel gears 13 and 14 secured in spaced positions thereon. As shown in the drawing the shaft 10 may be mounted on antifriction bearings 15 adjacent its opposite ends.

Mounted within the housing 11 at its lower end and disposed at right angles to the driving shaft 10 is a driven shaft 16 adapted for connection to a feed, twist or other mechanism of the textile machine. Disposed above the driven shaft 16 is an intermediate shaft 17. At one end of shaft 16 is a driving gear 18 meshing with a pinion 19 on the intermediate shaft 17. Shaft 17 is mounted on anti-friction bearings 20 and is retained against axial movement in any preferred or usual manner.

Slidably mounted on the intermediate portion of the shaft 17 is a sleeve 21 having at one end a large bevel gear 22 preferably formed integrally therewith. In one axial position of the sleeve 21 bevel gear 22 meshes with gear 13 on the driving shaft 10 and drives shaft 17 at a relatively slow speed in a manner presently to be described. On the opposite end of sleeve 21 from the gear 22 is a gear 23 meshing, in the position shown in the drawing, with the bevel gear 14. Gear 23 is held in place on shaft 17 by means of a threaded member 24 engaging screw threads on the end of sleeve 21. Shaft 17 is forced to rotate with the sleeve 21 by means of a key 25 extending through an elongated but narrow slot 26 in shaft 17 and entering recesses within the sleeve 21 and gear 23.

Centrally disposed within the shaft 17 is a shift rod or shaft 27 through which the key 25 transversely extends. From the above it will be seen that by axial movement of the rod or shaft 27 the sleeve 21 can be moved axially relative to shaft 17 to engage gear 22 or gear 23 with its mating gear 13 or 14 respectively. To axially adjust and retain the rod 27 in its longitudinal position to engage one or the other pair of gears the rod 27 is extended beyond the end of intermediate shaft 17 and is provided with two spaced annular grooves 28 and with two transverse slots 29. The shaft 17 is provided with a single transverse slot through which may extend a key or pin 30. In either operative position of the rod 27 pin 30 passes through the transverse slot in shaft 17 and through one of the slots 29 in the rod 27. To prevent the pin 30 from accidentally coming out of its slots during operation a collar 31 is fitted over the end of shaft 17 far enough to enclose the pin 30. Collar 31 is retained in position by means of a screw 32 bearing against the rod 27 within one of its grooves 28. In either position of the rod 27 screw 32 may fit into one of the grooves 28. To change the speed of shaft 16 relative to its driving shaft 10 by axially moving the sleeve 21 it is only necessary to remove the collar 31 from the rod 27, remove the pin 30 and after shifting the rod 27 to the opposite position replace the pin 30 in the other slot and again fasten the collar 31 over the ends of shaft 17 and rod 27.

I claim as my invention:

1. A gear transmission for textile machines comprising in combination, a driving shaft having two spaced gears thereon, a driven shaft, an intermediate shaft, gears drivingly connecting said intermediate and driven shafts, a sleeve slidable on said intermediate shaft, spaced gears thereon selectively usable with the gears on said driving shaft, means to axially position said sleeve to engage its gears with their mating gears respectively, including a shifting rod for said sleeve, and a transverse key extending through a slot in said intermediate shaft and through either of two slots in said shifting rod to retain the rod and sleeve in axial position.

2. A gear transmission for textile machines comprising in combination, a driving shaft having two spaced gears thereon, a driven shaft, an intermediate shaft, gears drivingly connecting said intermediate and driven shafts, a sleeve slidable on said intermediate shaft, spaced gears thereon selectively usable with the gears on said driving shaft, means to axially position said sleeve to engage its gears with their mating gears respectively, including a shifting rod for said sleeve, a transverse key disposed within said intermediate shaft and shifting rod to retain said rod in either of two positions, and a collar fitting over the end of the intermediate shaft to retain said key in position.

3. A gear transmission for textile machines comprising in combination, a driving shaft having two spaced gears thereon, a driven shaft, an intermediate shaft, gears drivingly connecting said intermediate and driven shafts, a sleeve slidable on said intermediate shaft, spaced gears thereon selectively usable with the gears on said driving shaft, a shift rod for axially positioning said sleeve to engage its gears with their mating gears respectively, a transverse key extending through a slot in said intermediate shaft and through one of two alternately usable spaced slots in said shift rod, and a collar secured to said shift rod to retain said key in position.

WILLIAM R. GORDON.